(12) United States Patent
Förster

(10) Patent No.: US 7,017,719 B2
(45) Date of Patent: Mar. 28, 2006

(54) VIBRATION DAMPER WITH ADJUSTABLE DAMPING FORCE

(75) Inventor: Andreas Förster, Schweinfurt (DE)

(73) Assignee: ZF Sachs AG, Schweinfurt (DE)

(*) Notice: Subject to any disclaimer, the term of this patent is extended or adjusted under 35 U.S.C. 154(b) by 0 days.

(21) Appl. No.: 10/744,551

(22) Filed: Dec. 22, 2003

(65) Prior Publication Data

US 2004/0134730 A1   Jul. 15, 2004

(30) Foreign Application Priority Data

Dec. 21, 2002   (DE) ............................... 102 60 394

(51) Int. Cl.
*F16F 9/00* (2006.01)

(52) U.S. Cl. .................... 188/314; 188/322.2
(58) Field of Classification Search ................ 188/314, 188/315, 318, 322.13, 322.2, 299.1; 267/64.11, 267/64.12, 64.13, 64.28, 136
See application file for complete search history.

(56) References Cited

U.S. PATENT DOCUMENTS 4,743,000 A * 5/1988 Karnopp ..................... 267/218
5,699,885 A * 12/1997 Forster ........................ 188/317

FOREIGN PATENT DOCUMENTS

| DE | 35 24 863 A1 | 10/1986 |
| DE | 38 27 255 A1 | 2/1990 |
| DE | 42 13 803 A1 | 10/1993 |
| DE | 44 23 526 C1 | 12/1995 |
| EP | 1 176 334 A2 | 1/2002 |

* cited by examiner

*Primary Examiner*—Pam Rodriguez
(74) *Attorney, Agent, or Firm*—Cohen, Pontani, Lieberman & Pavane

(57) ABSTRACT

A piston is guided with freedom of axial movement in a damping medium-filled pressure tube, the piston dividing the pressure tube into a working space on the piston rod side of the piston and a working space on the side away from the piston rod. The medium can flow in either direction through a fluid connection between the two working spaces of the pressure tube, in which connection an adjustable damping valve for the incoming flow is provided for when the piston rod is traveling inward. The outgoing flow side of the valve is connected at least to the working space on the piston rod side of the piston and a compensating space. The adjustable damping valve can be controlled by way of a sidestream inside the fluid connection between the working space on the side away from the piston rod and the working space on the piston rod side of the piston, the adjustable damping valve having a sidestream channel leading to the compensating space.

8 Claims, 3 Drawing Sheets

VIBRATION DAMPER WITH ADJUSTABLE DAMPING FORCE

BACKGROUND OF THE INVENTION

1. Field of the Invention

The invention relates to a vibration damper with adjustable damping force of the type having a pressure tube in which a piston rod with a piston is guided with freedom of axial movement, the piston dividing the pressure tube into a working space around the piston rod and a working space away from the piston rod, the working spaces being filled with damping medium.

2. Description of the Related Art

U.S. Pat. No. 6,464,048 discloses a vibration damper with adjustable damping force having a completely closed piston on an axially movable piston rod. As a result, the piston divides the interior of the cylinder into two working spaces, each of which has a fluid connection to an adjustable damping valve, which is controlled in turn by an actuator. The control is implemented via the adjustable throttling of a control stream or sidestream in the damping valve. A common actuator is used for the two adjustable damping valves, one of which is provided for each flow direction. Both the mainstream displaced through each of the damping valves and the sidestream controlled by the actuator are displaced from the working space in question into a common reservoir. Additional supply channels proceed from the reservoir to the two working spaces; the working space which is without pressure at the time in question can thus be supplied with damping medium when the piston rod moves, so that it is impossible for a negative pressure to develop at any time.

A vibration damper having a closed piston is also disclosed in U.S. Pat. No. 4,743,000, where the volume displaced from the compressed working space is displaced in its entirety through the directly controlled damping valve. The description "directly controlled" is to be understood in the sense that the closing force acting on the disk spring of the adjustable damping valve or on the helical valve slide is applied directly by an actuator such as a controlling magnet. In the case of an indirectly controlled damping valve, such as that described in U.S. Pat. No. 6,464,048, use is made of the pressure of a fluid stream, namely, a sidestream, to exert an opening and closing force on a valve body.

The damping medium leaving the damping valve of U.S. Pat. No. 4,743,000 is distributed as a function of volume between the enlarged working space and the connected compensating space. In FIG. 3 of this patent, the compensating space is external to the vibration damper. The cylinder has a fluid connection in each case to a single, directly controlled damping valve, the damping force of which can be adjusted asymmetrically; that is, when a large damping force setting is present in the outward travel direction, a small damping force setting is selected for the inward travel direction and vice versa. In FIG. 5 of this same document, the compensating space is in a ring-shaped area between a container tube and the cylinder. The outlets of the adjustable damping valves are combined into a single fluid connection, which has a branch leading away to the compensating space. The two damping valves according to FIG. 5 are both spatially and structurally separate, and each has its own actuator.

DE 44 23 526 A1 describes a vibration damper with adjustable damping force, in which a damping medium-filled pressure tube is divided by a piston on an axially movable piston rod into a working space on the piston rod side of the piston and a working space on the side away from the piston rod, where a stream of damping medium, which flows between the two working spaces, is divided into a mainstream and a sidestream. In the path traveled by the stream of damping medium, a damping valve device is provided, which consists, for each direction of flow, of a damping valve body with a main stage valve; each main stage valve is formed in turn by a main stage valve body, which defines a control space, the main stage valve body moving axially in the control space in response to the arriving flow. A pilot valve is also provided; the minimum of one main stage valve is controlled by an automatic actuator, which allows a certain sidestream to flow through a connection from the control space to a working space of the pressure tube, and, in both flow directions in each case, the mainstream flows through a main stage valve body of the main stage valve, and the sidestream flows through the pilot valve. So that a "skyhook" automatic control strategy can be realized, the pilot valve has two different control cross sections, which can be used alternately; depending on its direction, the sidestream passes through one of the control cross sections and a nonreturn valve, which opens in the flow direction. The mainstream determines the level of the damping force, whereas the sidestream serves to control the adjustable damping valve with the goal of minimizing the energy input.

SUMMARY OF THE INVENTION

The task of the invention is to realize a vibration damper which, in association with an adjustable, pilot valve-controlled damping valve, can have a piston that is closed in the inward travel direction of the piston rod.

According to the invention, the adjustable damping valve can be controlled via a sidestream within the fluid connection between the working space on the piston rod side of the piston and the working space on the side away from the piston rod, whereby the adjustable damping valve has a sidestream exit route leading to the compensating space.

Even in the case of a pilot valve-controlled adjustable damping valve, a closed or nearly closed piston can be used. The sidestream can always be discharged into the compensating space, even when the mainstream is blocked in the adjustable damping valve.

As a further design elaboration, the adjustable damping valve has a control space, the damping medium of which exerts pressure on a main stage valve body of the damping valve; the control space is supplied by the sidestream, and, when the main stage valve body is raised, the mainstream displaced from the working space on the piston rod side of the piston is connected to the compensating space. As a result of the series connection of the adjustable damping valve upstream of the compensating space, it is possible to realize a nearly unlimited pressure drop at the adjustable damping valve, especially for the damping medium displaced when the piston rod travels inward, which means that a correspondingly large ratio between the maximum and the minimum damping force can be achieved.

In terms of design, it is advantageous for the mainstream to be connected along with the sidestream to the compensating space by the adjustable damping valve.

According to an advantageous embodiment, the control space has a separating wall, in which a channel leads from the sidestream outflow to the mainstream channel leads for the mainstream from the working space on the side away from the piston rod to the compensating space. The shortness of the attachment of the sidestream outflow to the mainstream channel simplifies the design of the adjustable damping valve It is also provided that an adjustable damping valve for the direction in which the damping medium flows when the piston rod is traveling outward is provided in the fluid connection between the two working spaces. This damping valve has a control space, and the damping medium in this control space exerts pressure on a main stage valve body of the damping valve; the control space being supplied by the sidestream; and, when the main stage valve body is raised, the mainstream displaced from the working space on the piston rod side of the piston is connected together with the sidestream to the compensating space.

According to an advantageous embodiment, the adjustable damping valve has the control spaces for the sidestreams from the two working spaces in a common housing, where the outgoing sidestream from one of the two control spaces is connected not only to the sidestream channel leading to the compensating space but also, via the other control chamber, to the working spaces in the pressure tube.

For this purpose, the separating wall is located between the two control spaces. The amount of space required for the sidestream channel is extremely small, and, because the radial dimension of the control spaces is relatively small, the channel can also be made very short.

So that the stroke of the vibration damper does not have to be limited on account of the use of the adjustable valves, the adjustable damping valve is located in a cylinder mounted on an axis parallel to that of the pressure tube.

To minimize the number of sealing points along the route taken by the fluid from the working spaces to the minimum of one adjustable damping valve, the fluid connection between the working spaces and the adjustable damping valve is formed by the pressure tube and an external, intermediate tube concentric to the pressure tube.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
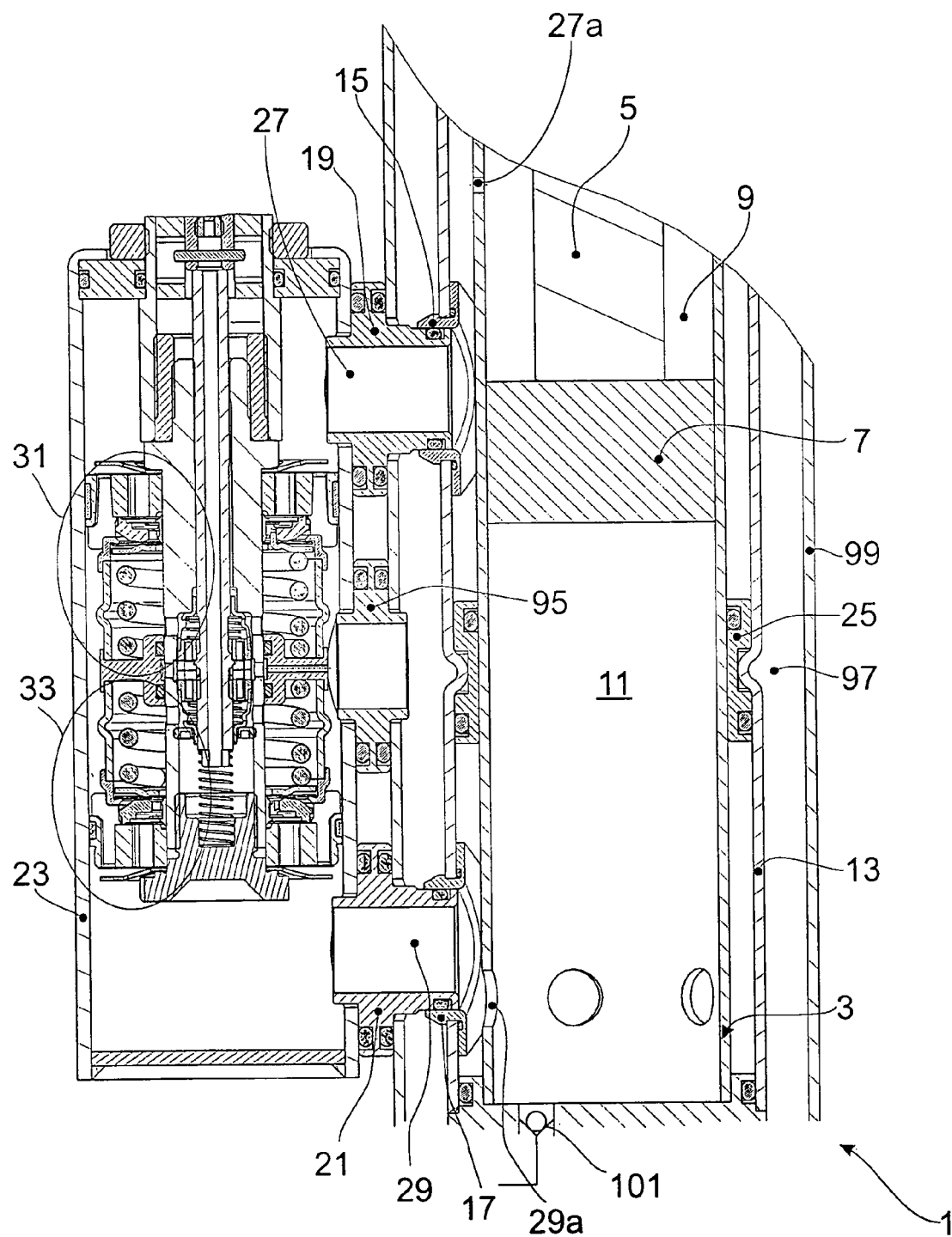
FIG. 1 shows part of a vibration damper according to the invention with an adjustable damping valve.

FIG. 1 shows part of a vibration damper 1, which has a pressure tube 3, in which a piston rod 5 with a piston 7 is guided with freedom of axial movement. The pressure tube is completely filled with a damping medium, and the piston divides the pressure tube into a working space 9 on the piston rod side of the piston and a working space 11 on the side away from the piston rod. There are no flow connections in the piston between the two working spaces, so that the piston forms a simple displacing element. If desired, a pressure-limiting valve can be installed in the piston between the two working spaces. Concentric to the pressure tube, an external intermediate tube 13 is provided, which for its own part has two sockets 15; 17, each of which receives a connector 19; 21, these two connectors being mounted on a cylinder 23, the axis of which is parallel to that of the vibration damper. The ring-shaped space between the pressure tube 3 and the intermediate tube 13 is divided by a separating sleeve 25 located between the two sockets 15; 17 in such a way that, via openings 27*a*; 29*a* in the pressure tube, a first fluid connection 27 leads from the working space 9 on the piston rod side of the piston to the cylinder 23, and a second fluid connection 29 leads from the working space 11 on the side away from the piston to the cylinder 23.

Figure 2:
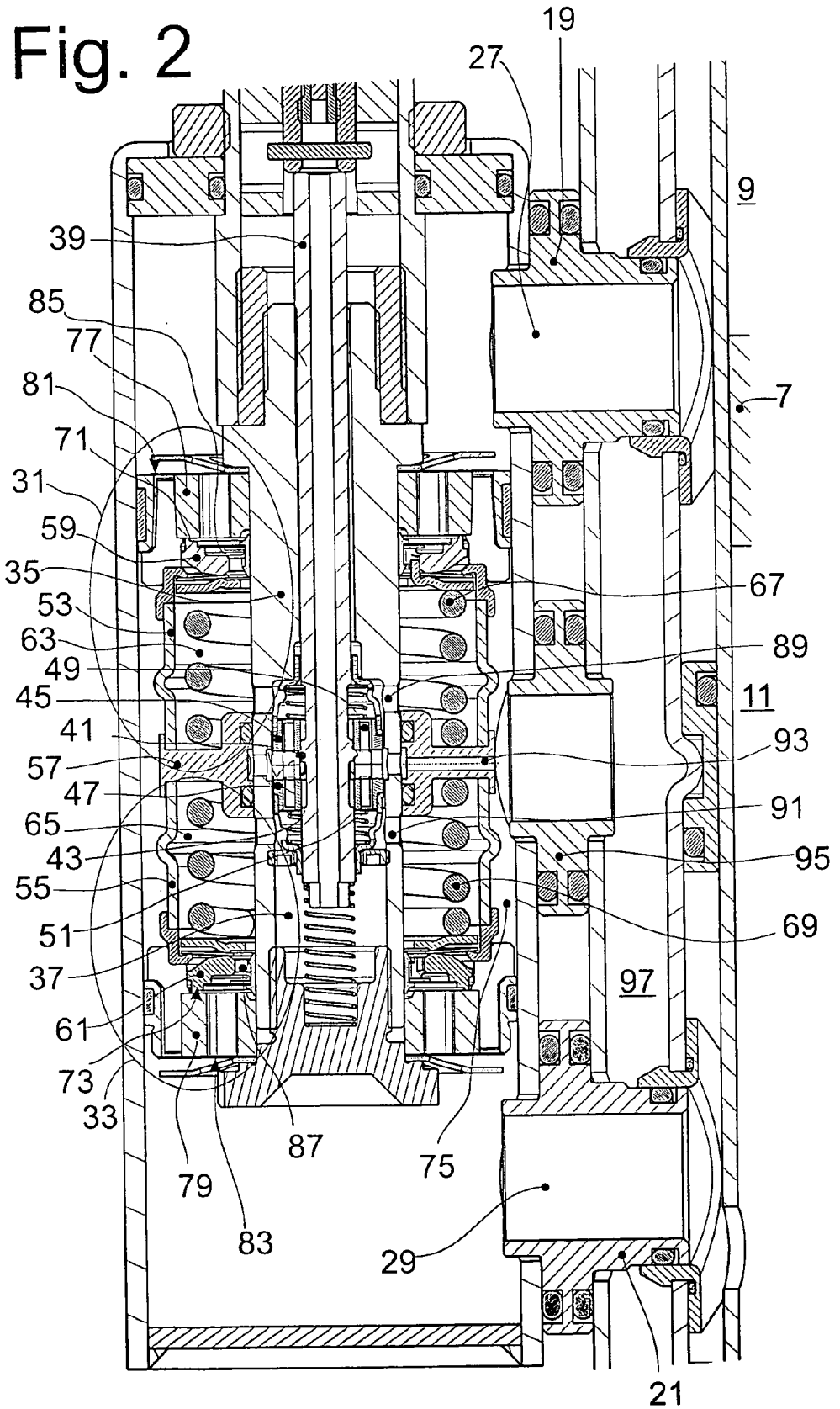
FIG. 2 shows part of the adjustable damping valve.

The cylinder 23 forms a housing, which holds a first adjustable damping valve 33 for the inward travel direction of the piston rod and a second adjustable damping valve 31 for the outward travel direction. As can be seen in FIG. 2, a tubular body 35 extends axially through the housing; in this tubular body, an axially movable pilot valve rod 39 is supported inside a pilot valve space 37; the valve rod has two valve surfaces 41; 43, which work together with assigned valve edges of a pilot valve body 45; 47. When the pilot valve rod 39 moves, a pass-through cross section is opened between the valve surfaces 41; 43 and the one of the pilot valve bodies 45, 47, and is reduced in size at the other of the pilot valve bodies 45, 47. A nonreturn valve 49; 51 is connected in parallel with each of the two pilot valve bodies.

Concentric to the tubular body 35, two sleeves 53; 55 installed in series, form the center parts of the inner housings of the damping valves 31; 33, where a separating wall 57 works together with the sleeves 53; 55 and the main stage valve bodies 59; 61 to form control spaces 63; 65. The two main stage valve bodies are each preloaded by at least one closing spring 67; 69 against a valve seat 71; 73. The inside diameter of the cylinder 23 and the outside wall of the sleeves 53; 55 form a ring-shaped, main stage channel 75, to which the two valve seats 71; 73 of the main stage valve body 59; 61 are connected. Valve heads 77; 79 form the valve seats for the main stage valve bodies 59, 61 and have nonreturn valves 81; 83 facing in the direction of the connectors to prevent the damping medium from entering the main stage channel 75 directly from the adjacent working space.

Inside the main stage valve bodies 59, 61 are small pass-through openings 85; 87, so that the control spaces 63; 65 are permanently filled with damping medium. Each of the two control spaces has at least one connecting opening 89; 91 leading to the pilot valve space 37. Depending on the position of the pilot valve rod 39 relative to the valve edges of the two pilot valve bodies 45; 47, a certain backpressure, which exerts an additional closing force on the main stage valve bodies 59; 61, builds up inside the control spaces 63; 65.

The damping medium leaving one of the control spaces 63, 65 via the valve space 37 represents a so-called sidestream, which can flow via the other control space 63, 65 to the assigned connector of the working space.

Inside the separating wall 57 between the two connecting openings 89; 91 to the control spaces, a sidestream channel 93 is provided, which is sealed off from the two connecting openings; this channel starts from the area between the two pilot valve bodies 45, 47 inside the pilot valve space 37 and proceeds via another connector 95 to a compensating space 97, which is located between the intermediate tube 13 and the container tube 99.

When the piston 7 moves toward the working space 9 on the piston rod side of the piston, the damping medium present in the working space 9 is displaced through the connector 19 into the cylinder 23 and arrives at the incoming flow side of the adjustable damping valve 31, thus striking the closed nonreturn valve 81 of the valve head 77 and the main stage valve body 59, which is in the closed position. The pass-through opening 85 makes it possible for the flow to enter the control space 63 and, via the connecting openings 89, to enter the pilot valve space 37. Depending on the position of the axially movable pilot valve rod 39 with respect to the pilot valve body 45, a backpressure builds up in the control space 63, which pressure allows the main stage valve body 59 to rise from its valve seat 71 on the valve head 77. The mainstream now flows through the main stage channel 75 to the connector 95 leading to the compensating space 97 and onward, via the open nonreturn valve 83 in the lower valve head 79, to the fluid connection 29 of the connector 21 leading to the working space 11 on the side away from the piston rod.

Figure 3:
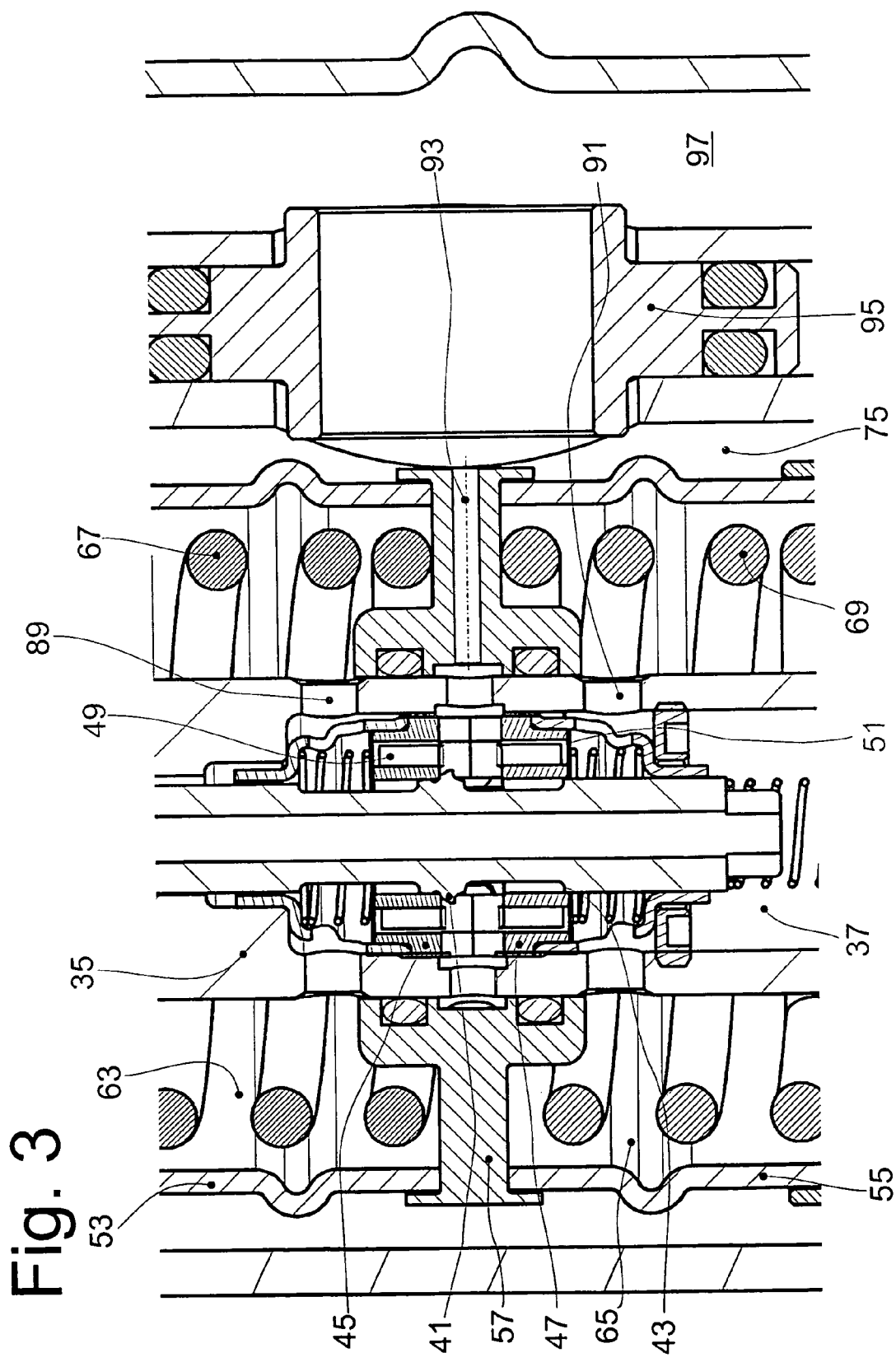
FIG. 3 shows an enlarged, detailed view of the pilot valve.

In parallel with that, the sidestream flows through the opened nonreturn valve 51 on the lower pilot valve body 47, into the control space 65, and through the main stage valve body 61, also in the direction toward the lower connector 21. The sidestream, however, can also flow through the sidestream channel 93 directly into the compensating space 97, so that the nonreturn valve 51 represents an optional flow route. In FIG. 3, the area of the pilot valve is illustrated again on a larger scale.

During the outward travel of the piston rod 5, the size of the working space 11 on the side away from the piston rod increases; this space can thus accept all of the volume displaced from the working space 9 on the piston rod side of the piston, i.e., the volume coming from the outflow side of the adjustable damping valve 31. The working space 11 also accepts the volume of the outward-moving piston rod 5 coming from the compensating space 97 via a bottom valve 101 (see FIG. 1).

When the piston rod travels inward, the entire volume with the cross section of the piston 7 is displaced from the working space 11 on the side away from the piston rod. When the piston rod moves slowly and the throttle cross section between the valve edge 43 of the axially movable pilot valve 39 and the lower pilot valve body 47 is small, a corresponding added force, which acts on the main stage valve body 61, builds up in the control space 65, so that this valve body does not rise from its valve seat 73. The damping medium of the sidestream leaving the control space 65 can be discharged via the sidestream channel 93 in the separating wall 57 into the compensating space 97.

At a lower pressure setting of the pilot valve rod 39 with respect to the pilot valve body 47, the main stage valve body 61 rises from its valve seat 73 as a result of the weaker closing force in the control space 65, so that the damping medium displaced from the working space 11 on the side away from the piston rod can flow into the main stage channel 75 and to the connectors 95 of the compensating space 97 and connector 19 of the working space 9 on the piston rod side of the piston. The working space 9 on the piston rod side of the piston is filled only by the volume displaced from the working space 11 on the side away from the piston rod, so that only the excess volume of the inward-traveling piston rod is displaced into the compensating space.

Even when the piston rod is traveling inward, it would be possible for the sidestream in the control space 65 to leave through the pilot valve space 37 and proceed via the sidestream channel 93 to the compensating space 97 without it being necessary for the nonreturn valve 49 to open.

It would be possible to simplify the design of the pilot valve body 45; 47 by omitting the nonreturn valves 49; 51 and to use closed pilot valve bodies. Exclusive use would then be made of the sidestream channel 93 for carrying away the sidestream.

In the design of the vibration damper described above, the volume flow rates between the working spaces and the damping valves are always clearly defined by the direction in which the piston rod moves, which means that it is possible to implement a "skyhook" control strategy without the need for sensors to detect the direction of piston rod movement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper with adjustable damping force, comprising:

a pressure tube in which a piston rod with a piston is guided with freedom of axial movement, the piston dividing the pressure tube into a working space around the piston rod and a working space away from the piston rod, the working spaces being filled with damping medium;

a fluid connection comprising a mainstream and a sidestream connecting the two working spaces, the fluid connection being wholly outside the piston, the damping medium moving in a first direction through the connection when the piston rod is moving inward and a second direction through the connection when the piston rod is moving outward;

a first adjustable damping valve in the fluid connection, the first adjustable damping valve receiving damping medium moving in the first direction and directing the damping medium to the working space around the piston rod and to a compensating space, the first adjustable damping valve comprising a mainstream channel leading to the working space around the piston rod and a sidestream channel leading to the compensating space, whereby the first adjustable damping valve can be controlled by the sidestream; and a separating wall in a first control space, the sidestream channel being located in the separating wall and connecting the sidestream to the mainstream channel for directing the mainstream from the working space away from the piston rod to the compensating space.

2. The vibration damper of claim 1, wherein the first adjustable damping valve comprises the first control space which is supplied with damping medium via the sidestream and a first main stage valve body which is subjected to pressure by the damping medium in the first control space, whereby the first main stage valve body can be raised in order to direct the mainstream from the working space away from the piston rod to the compensating space.

3. The vibration damper of claim 1, wherein both the mainstream and the sidestream can be connected to the compensating space by the first adjustable damping valve.

4. The vibration damper of claim 1, further comprising a second adjustable damping valve in the fluid connection, the second adjustable damping valve receiving damping medium moving in the second direction and having a second control space which is supplied with damping medium via the sidestream and a second main stage valve body which is subjected to pressure by the damping medium in the second control space, whereby the second main stage valve body can be raised in order to direct the mainstream from the working space around the piston rod to the sidestream to the working space away from the piston rod.

5. The vibration damper of claim 4, further comprising a common housing for said first and second control spaces, whereby the sidestream leaving one of the control spaces is connected to the sidestream channel and to the working spaces via the other of the control spaces.

6. The vibration damper of claim 5, wherein said separating wall is located between the first and second control spaces.

7. The vibration damper of claim 5, further comprising a cylinder parallel to the pressure tube, the first and second adjustable damping valves being located in the cylinder.

8. The vibration damper of claim 1, further comprising an intermediate tube located concentrically outside of the pressure tube, part of the fluid connection being formed by a space between the pressure tube and the intermediate tube.

* * * * *